Feb. 6, 1951
W. W. KELLY
2,540,740
FLEXING DISK FRUIT STEMMING MECHANISM
AND CONVEYER THEREFOR
Filed Nov. 6, 1946
3 Sheets-Sheet 3
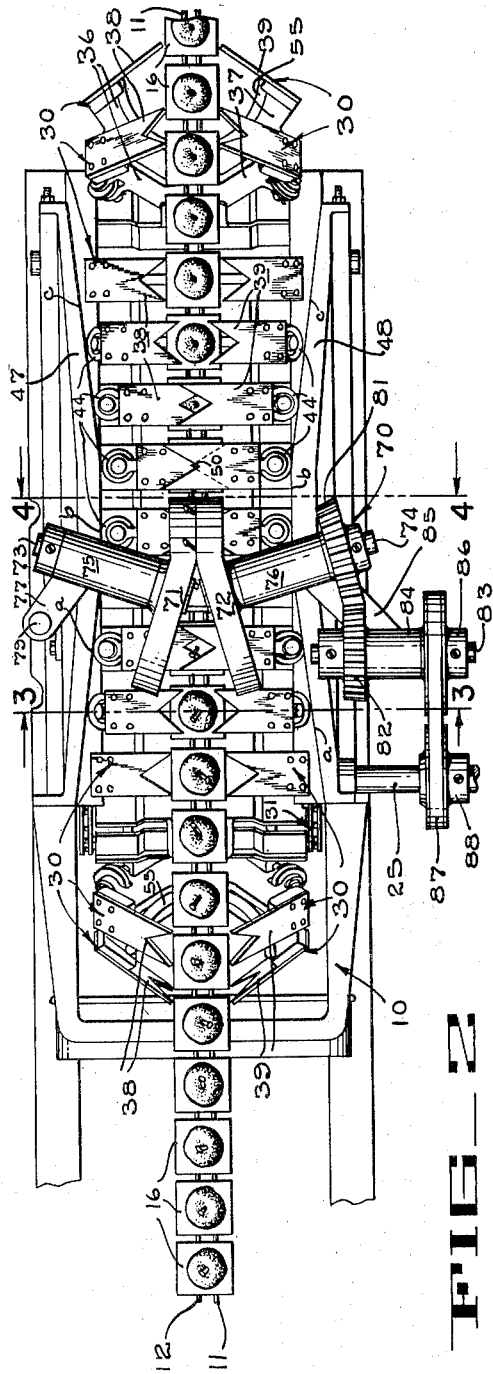
FIG_2
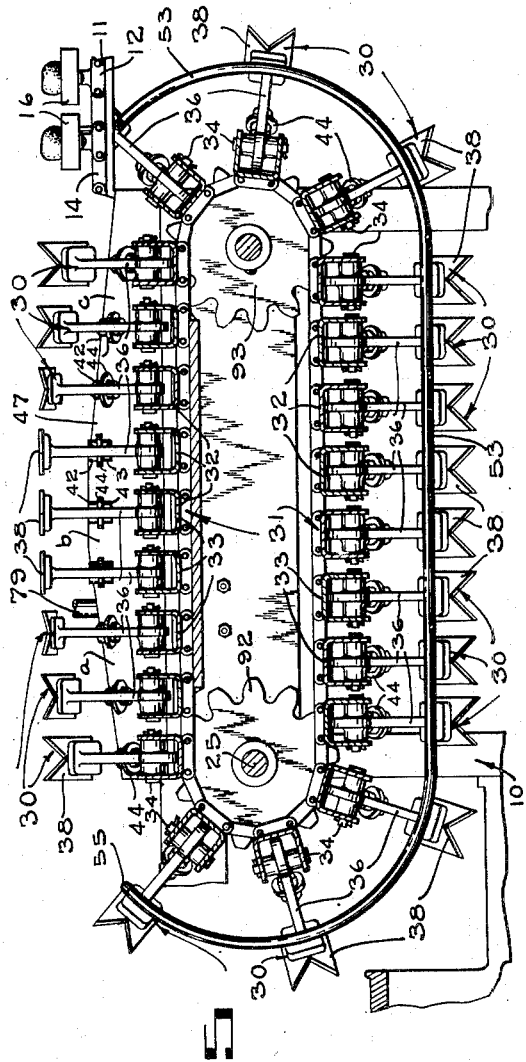
FIG_5
INVENTOR
WALTER W. KELLY
BY Philip A. Minnis
Hans G. Hoffmeister
ATTORNEYS Patented Feb. 6, 1951

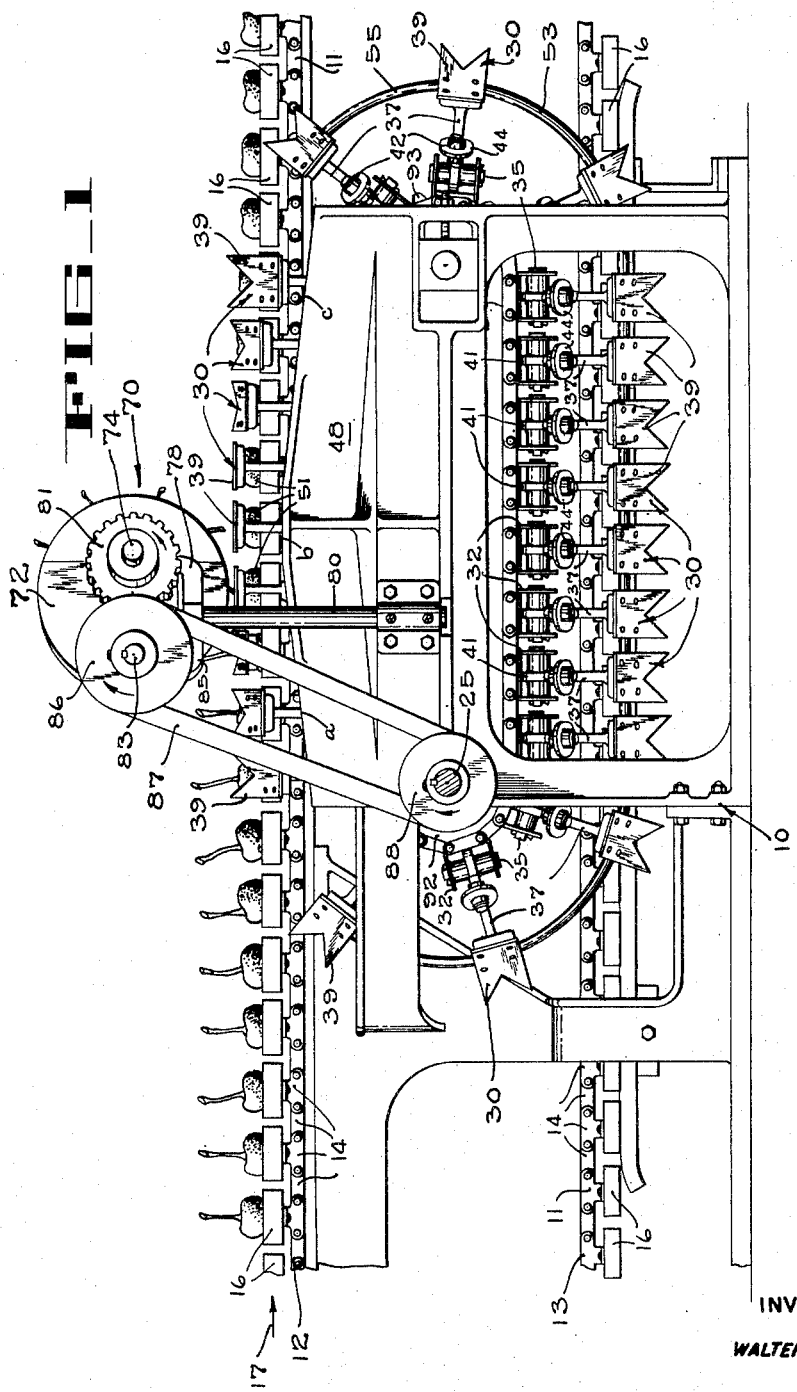

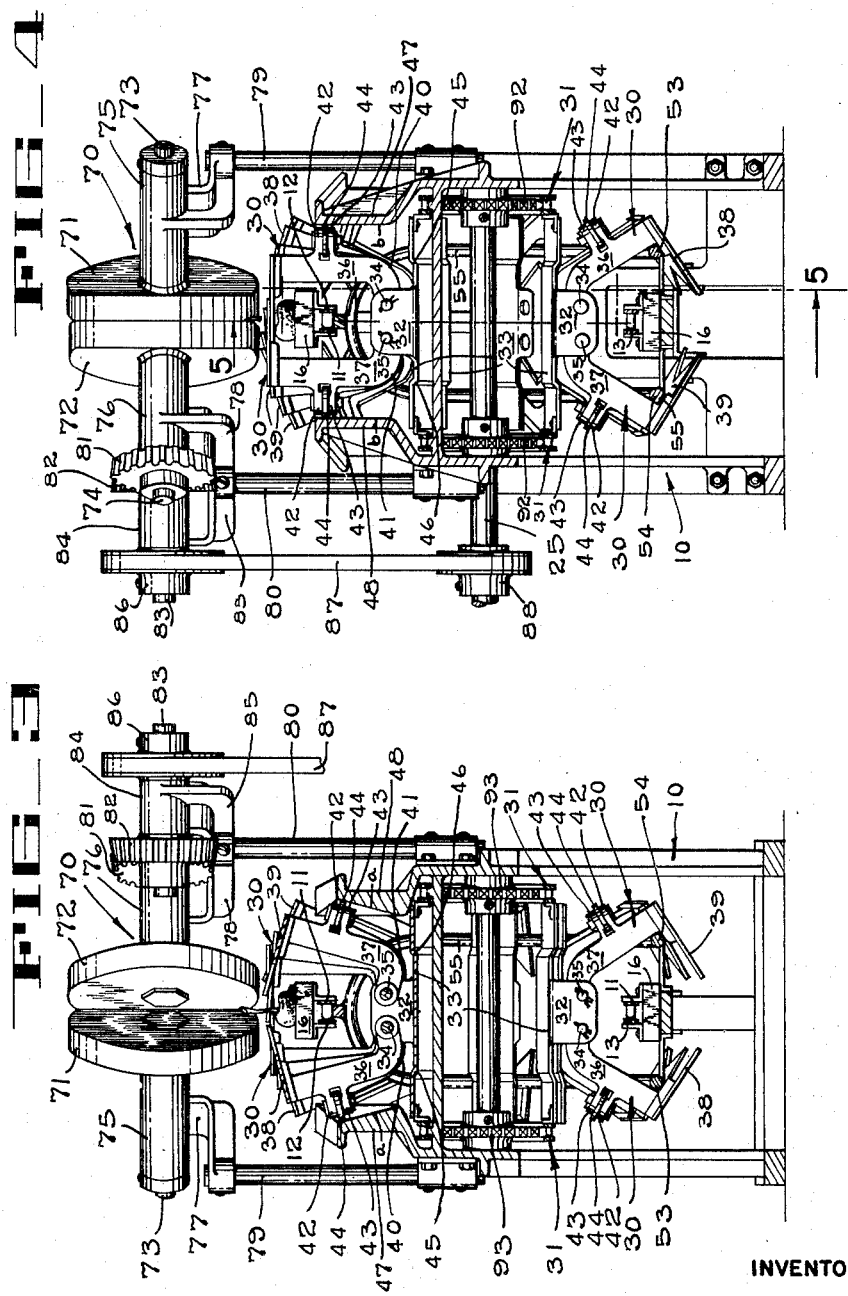

2,540,740

UNITED STATES PATENT OFFICE 2,540,740

FLEXING DISK FRUIT STEMMING MECHANISM AND CONVEYER THEREFOR

Walter W. Kelly, Portland, Oreg., assignor to Food Machinery and Chemical Corporation, a corporation of Delaware Application November 6, 1946, Serial No. 708,000

14 Claims. (Cl. 146—55)

The present invention relates to automatic fruit stemming machines and contemplates to simplify the stem plucking mechanism thereof and to improve its reliability of operation.

Known fruit stemming machines of simple construction employ usually two axially abutting rollers or drums disposed closely adjacent to a fruit conveyor with their axes parallel to the direction of conveyance. When these rollers revolve inversely, the fruit stems projecting from the conveyor line are gripped and plucked while the fruit is retained on the conveyor by suitable mechanical means such as slotted guide shields. However, since rollers arranged as described have only a lineal contact, their grip may at times be insufficient to pluck the stems, especially should they be thin; also since this lineal contact is removed from the fruit passing underneath, by a distance at least as great as the radius of the rollers employed, short or tilted stems may pass the plucking mechanism without being gripped at all.

Improved machines of more complex construction, therefore, employ running belts instead of simple rollers, guide means being provided to force the cooperating belts into parallel gripping relation over a certain portion of their travel. While such arrangements provide larger gripping areas for the fruit stems and may be made to extend closer to the fruit itself, each such plucking belt requires a plurality of pulleys and frequently a number of guide means of critical adjustment, all of which render the resultant mechanisms costly and complex in construction and subject to failures depending on the adjustment of the guide means.

Broadly, it is therefore an object of the present invention to provide a stem plucking mechanism for machines of the type referred to, which is simple in construction and reliable in operation.

Another object of the present invention is to furnish a stem plucking mechanism which provides a large and firmly gripping contact area.

Another object of the present invention is to so arrange a stem plucking mechanism of the abutting-disc-type as to provide a firmly gripping contact area that reaches within close proximity of the fruit to be stemmed.

Still another object of the present invention is to provide automatically effective means in machines of the type here under consideration, to reliably retain the fruit in its proper position during the stemming operation and until completion thereof.

These and other objects of the present invention will be apparent from the following description and the accompanying drawing which illustrates a preferred embodiment thereof and wherein—

Fig. 1 is a side elevation of a fruit stemming machine embodying my invention;

Fig. 2 is a plan view of the machine shown in Fig. 1;

Fig. 3 is a transverse section through the machine taken along line 3—3 of Fig. 2;

Fig. 4 is a transverse section through the machine taken along line 4—4 of Fig. 2; and Fig. 5 is a side elevation of the mechanism adapted to retain the fruit on the conveyor during the stemming operation.

Referring to Fig. 1, the machine illustrated in the drawings includes a stationary frame 10 and an endless conveyor belt 11 of the sprocket chain type trained around sprocket wheels not shown. The conveyor chain 11 comprises an upper horizontally disposed reach or section 12 and a lower reach or section 13. The chain 11 is formed by a plurality of links 14 and each alternate link of the conveyor chain carries a fruit supporting cup 16 having a central depression to seat a cherry or like fruit. One of the sprocket wheels of the conveyor 11 is driven so as to effect travel of the upper reach 12 in the direction of arrow 17 (Fig. 1).

The cherries to be handled by the machine are placed stem end up into the cups 16 either manually or by an automatic positioning and feeding device of any desired construction.

As the fruit supporting cups 16 travel along the upper horizontal reach 12 of the conveyor line 11 toward stem plucking unit 70, fruit-retaining means 30 are gradually brought into position to hold the cherries down in cups 16 while their stems are being plucked. For this purpose an auxiliary conveyor line 31 of the sprocket chain type is provided, which is arranged concentrically within main conveyor line 11 and is trained around sprockets 92 keyed upon drive shaft 25 and idler sprockets 93, as shown in Fig. 5.

Each alternate link of auxiliary conveyor line 31 carries a U-shaped bracket 32, as shown in Fig. 5, and swivelled to each such bracket are two symmetrically arranged L-shaped arms 36 and 37 (Figs. 3 and 4) by means of two parallel pivot studs 34 and 35, respectively, which pass through the horizontal bars of the L-shaped arms, as shown in Figs. 3 and 4, and are suitably supported in the upright shanks of bracket 32. Spacer beads may be provided around pivots 34 and 35 at either side of L-shaped arms 36 and 37, respectively, to properly maintain these arms in their centered positions within U-shaped brackets 32. At their upper ends the vertical bars of L-shaped arms 36 and 37 carry inwardly directed claws 38 and 39, respectively, in the form of rectangular plates, the inner edges of which are provided with V-shaped notches, as shown in Fig. 2.

The vertical rear or outside edges of arms 36 and 37 are each provided with two outwardly extending lugs 42 and 43, which form bearings for the pivot of a guide roller 44 as more clearly shown in Figs. 3 and 4.

Due to the inwardly displaced centricity of pivots 34 and 35 relative to the vertical bars of L-shaped arms 36 and 37, respectively, these arms will normally swing backwards under their own weight until their corners 40 and 41 strike against shallow shoulders 45 and 46 provided in the bottom plate 33 of U-shaped bracket 32 (Figs. 3 and 4); in this position, claws 38 and 39 will be spread sufficiently apart to move freely past main conveyor line 11 on either side thereof, into cooperation with a corresponding fruit supporting cup 16 (Figs. 1 and 2).

During the main part of its horizontal travel parallel to the upper horizontal reach of main conveyor line 11, auxiliary conveyor line 31 is flanked by two guide walls 47 and 48 rigidly supported in any suitable manner from frame 10, and adapted to engage rollers 44 on both arms 36 and 37 in the manner of a camway as soon as claws 38 and 39 have risen above cups 16. As may be seen from Fig. 2, walls 47 and 48 have an initial converging phase $a$, a centrally positioned parallel phase $b$, and a final diverging phase $c$. As rollers 44 travel along the initial converging portion $a$ of the passage way formed by guide walls 47 and 48, arms 36 and 37 are cammed inwardly around their pivots 34 and 35, respectively, until their claws meet and slide above one another embracing the upwardly projecting stem of any cherry that may travel underneath in a corresponding cup 16. To avoid jamming of claws 38 and 39, it may be preferable to make one of arms 36 or 37 slightly longer than the other. Alternatively, these arms may be pivoted in U-shaped bracket 32 at slightly different altitudes.

When arms 36 and 37 arrive at the parallel portion $b$ of guide walls 47 and 48, they have assumed a practically upright position (Fig. 4) in which their claws ride over one another to such an extent that their V-shaped notches leave only a small central opening, such as shown at 50 in Fig. 2, through which the stem of a cherry travelling underneath in a cup 16, will protrude in the proper upright manner to be gripped and plucked by plucking unit 70. At the same time, claws 38 and 39 securely retain the cherry in its cup 16 in the position shown at 51 in Fig. 1, no matter how sudden and how forceful the upward pull may be which plucking unit 70 will exert upon the stem.

Upon completion of the stemming operation, supporting cup 16 and associated retaining unit 30 move into the diverging portion $c$ of the camway formed by guide walls 47 and 48. Arms 36 and 37 are now permitted to swing backwards, causing claws 38 and 39 to open up, as shown in Fig. 2, so that the fruit retaining unit 30 may descend past main conveyor line 11 and fruit supporting cups 16 to be returned to the entrance of camway 47, 48 around sprockets 93 and 92, as shown in Fig. 5.

In order that arms 36 and 37 of fruit retaining units 30 may, upon their return journey, approach the entrance of camway 47, 48 with their claws 38 and 39 sufficiently spread apart to ascend freely past fruit supporting cups 16 at either side thereof, two parallel runners 53 and 54 of a guide rail 55 are rigidly supported from frame 10 and extend parallel around auxiliary conveyor line 31, except for its upper horizontal reach, as shown in Fig. 5. These runners are arranged to engage the inside of arms 36 and 37 directly below their respective claws (Figs. 1 and 5), as the latter descend in opened condition below the upper horizontal reach of main conveyor line 11 and then act as guide rails to keep arms 36 and 37 properly apart against the force of gravitation, as they return in upside down condition to their initial position (Fig. 5), and until they have again risen past the fruit supporting cups 16 at the input side of conveyor 11 and are ready to close over the cherries seated therein.

Plucking unit 70 comprises two upright roller discs 71 and 72 of flexible material, such as rubber, which are disposed closely above conveyor line 11, as shown in Figs. 3 and 4. The rotational axes of discs 71 and 72 are angularly disposed to each other in symmetrical relation, relative to the direction of conveyance, as may best be seen from Fig. 2. In consequence thereof, discs 71 and 72 diverge from one another at an acute angle which opens toward the approaching section of conveyor line 11. However, discs 71 and 72 are mounted so closely together that only their front portions will diverge in the manner described, while their back segments contact and deform one another into parallel relationship, as shown in Fig. 2. Hence, while the front portions of roller discs 71 and 72 rotate in diverging planes, their rear portions rotate in a common vertical plane extending in the direction of conveyance. To operate in the manner described, discs 71 and 72 are firmly mounted upon shafts 73 and 74, respectively, which are rotatably received in horizontally disposed sleeves or bushings 75 and 76. These bushings are rigidly held with their axes symmetrically inclined relative to the direction of conveyance by arms 77 and 78 mounted on top of uprights 79 and 80, respectively, which in turn are rigidly attached to the frame 10.

In operation, discs 71 and 72 rotate in the opposite direction as conveyor line 11, i. e., counter-clockwise, as viewed in Fig. 1, so that the lower portion of the peripheries of the discs adjacent the upper reach of the conveyor 11 travel in the same general direction with the conveyor 11 and in a predetermined timed relation therewith. For this purpose a bevel gear 81 is keyed upon the free end of shaft 74 and meshes with another bevel gear 82 keyed upon a shaft 83, which is rotatably supported in a bushing 84. Bushing 84 is rigidly supported by a second arm 85 mounted upon upright 80. Shaft 83 also carries a pulley 86, over which is trained a drive belt 87, operated from a pulley 88 keyed upon previously mentioned drive shaft 25. Since drive shaft 25 rotates in clockwise direction, as viewed in Fig. 1, pulley 86 and bevel gear 82 will likewise rotate in clockwise direction, while bevel gear 81 and roller disc 72 will be driven in counter-clockwise direction as required. Roller disc 71 is an idler which is taken along by disc 72 due to the frictional engagement between the parallel rear portions of discs 71 and 72, as previously described.

As the cherries seated in cups 16 approach plucking unit 70, claws 38 and 39 of retaining units 30 will close over them in a manner hereinbefore explained. In this connection, it is essential for proper operation of the mechanisms described, that the movements of main conveyor line 11 and auxiliary conveyor line 31 are very accurately synchronised so that in passing through camway 47, 48, each retaining unit 30 will be properly aligned with a corresponding fruit supporting cup 16. The location of plucking unit 70 relative to conveyor lines 11 and 31 is such that by the time a cup 16 slides underneath the diverging portions of roller discs 71 and 72, claws 38 and 39 will have closed over the cherry seated therein and will straighten its stem into upright position, if such should not have been done properly at the time the cherry was placed into the cup. As soon as the cherry stem reaches the vertex of the acute angle formed by the diverging portions of roller discs 71 and 72, a firmly gripping contact area of a depth almost equal to the diameter of the discs will seize the stem and pull it obliquely upwards in the direction of conveyance, while claws 38 and 39 will force the cherry to proceed along a horizontal plane and, consequently, the stem is pulled, relatively speaking, in a direction substantially coincident with the stem blossom axis of the fruit and the stem and cherry thereby gently pulled apart. In this connection, very satisfactory results have been obtained by so proportioning the movements involved that the rate of advancement of conveyor line 11 is faster than the circumferential speed of discs 71, 72. As may best be seen from Figs. 2, 3 and 4, the plucking roller arrangement in accordance with my invention is such that the contact or gripping area of the rollers may be made to reach within close proximity of the fruit, so that even very short stems will be gripped and plucked, while the fruit itself is protected by claws 38 and 39 against any possible injury from rotating discs 71, 72.

While in explaining the nature and performance of the stem plucking unit in accordance with my invention, I have disclosed a particularly advantageous retaining mechanism to maintain the fruit on the conveyor during the plucking operation, it will be understood that many other retaining means may be successfully employed in carrying out my invention, such as slotted cover shields disposed between the fruit conveyor and the plucking mechanism.

Having thus described my invention and the manner in which it is to be used, what I claim is:

1. In a conveyor line carrying a sequence of supports adapted to seat cherries and like fruit, the arrangement for positively retaining said fruit on said supports over a predetermined section of said line while permitting the stems thereof to extend in upward direction; which includes a second conveyor line having a reach coextensive with but below said first conveyor line at said predetermined section thereof, arms pivoted on said second conveyor to swing laterally away therefrom into outwardly inclined positions, an inwardly directed retaining member mounted on top of each of said arms and having a notched inner edge for centering the stem of a fruit seated in a support on said first conveyor line, guide means coextensive with a section of said conveyor line and adapted to cam said arms inwardly into upright positions wherein said retaining members extend above said supports of said first conveyor line.

2. In a conveyor line carrying a sequence of supports adapted to seat fruit, the arrangement for positively retaining fruit on said supports over a limited section of said line, which includes an endless chain carrying a plurality of fruit retaining units each comprising two arms pivoted to said endless chain and adapted to register with said supports at said limited section of said line and to swing outwardly away from one another, inwardly directed retaining members mounted on top of said arms, and guide means flanking a section of said line at either side thereof and adapted to cam said arms inwardly into positions wherein said retaining members close above said supports.

3. In a conveyor line carrying a sequence of cups and adapted to deliver cherries and like fruit to a stemming mechanism, the arrangement for positively retaining said fruit on said cups during the stemming operation while causing the stems of said fruit to extend in substantially upright direction, which includes an endless conveyor having one reach thereof disposed below the conveyor line, a plurality of fruit retaining units on said endless conveyor each adapted to register with a fruit cup in the conveyor line, each said fruit retaining unit comprising, two arms pivoted underneath said cups at either sides thereof to swing laterally away therefrom into outwardly inclined positions, inwardly directed retaining members mounted on top of said arms so as to swing above the cup in said conveyor line and having V-shaped notches in their confronting edges for embracing the stem of a fruit in said cup, and guide means flanking a section of said conveyor line at either side thereof, said guide means having an initial converging phase adapted to cam said arms inwardly into positions wherein said retaining members slide above one another, a central parallel portion adapted to retain said arms and said members in the described positions during the stemming operation, and a final diverging portion adapted to permit said arms to return to their outwardly inclined positions as they pass out of and into registration with the cups of said conveyor line.

4. Arrangement, according to claim 3, including guide rollers pivoted to the outside edges of said arms for cooperation with said guide means.

5. Conveyor arrangement for delivering fruit to and away from a stemming mechanism, including a main conveyor line of the endless belt type, having a sequence of fruit supporting cups mounted thereon; and auxiliary conveyor line of the endless belt type disposed within said main conveyor line and having a sequence of brackets mounted thereon, two lateral arms pivoted to each of said brackets to swing outwardly apart from one another, inwardly directed retaining members mounted on top of said arms and having V-shaped notches provided in their confronting edges, said conveyor lines having horizontal sections arranged to extend parallel and closely adjacent to one another, said conveyor lines being synchronised to align each bracket of said auxiliary conveyor line precisely underneath a cup travelling on said main conveyor line for the duration of their parallel travel; and camming walls flanking said parallel branches and adapted to cam said arms inwardly into positions wherein said retaining members close above said cups.

6. Arrangement, according to claim 5, including guide means arranged to keep said arms apart during their return travel from the egress of said camming walls to the entrance thereof.

7. Stemming mechanism for cherries and like fruit comprising a pair of discs of flexible material mounted for rotational movement in diverging planes of rotation, which planes intersect within the peripheries of both of said discs, the portions of said discs radially beyond the line of intersection of said planes being bent by mutual engagement into parallel abutting relation with each other; a fruit conveyor mounted to present the stem portions of fruit to an open end of said abutting disc portions to be gripped therebetween, a second conveyor having a portion of its path of travel coincident with and adjacent to said fruit conveyor and moving in synchronism therewith, said second conveyor carrying fruit retaining means, and means to interpose said retaining means between the fruit and the abutting disc portions to retain the fruit against the pulling force imposed on the gripped stem portions by rotation of said discs to separate the fruit and the stem portions.

8. Stemming mechanism for cherries and like fruit comprising a pair of discs of flexible material mounted for rotational movement in diverging planes of rotation, which planes intersect within the peripheries of both of said discs, the portions of said discs radially beyond the line of intersection of said planes being bent by mutual engagement into parallel abutting relation with each other; a fruit conveyor mounted to present the stem portions of fruit to an open end of said abutting disc portions to be gripped therebetween, a second conveyor having a portion of its path of travel parallel and adjacent to said fruit conveyor and traveling in synchronism therewith, said second conveyor carrying fruit retaining means, and means to interpose said retaining means between the fruit and the abutting disc portions to retain the fruit against the pulling force imposed on the gripped stem portions by rotation of said discs to separate the fruit and the stem portions, and drive means operatively connected to said conveyor and to one of said discs.

9. Stemming mechanism for cherries and like fruit including a first shaft, a first disc mounted thereon for rotation in a first plane, a second shaft angularly disposed to said first shaft, a second disc of flexible material mounted on said second shaft for rotation in a second plane diverging from said first plane, means for holding said second disc at such close range to said first disc that a substantial marginal portion of the second disc is deformed into parallel abutting relationship with a corresponding area of said first disc so as to have frictional driving engagement therewith, means for driving one of said discs, a conveyor for presenting the stem portions of fruit between the abutting portions of said discs to be gripped thereby, and a second conveyor having a portion of its path of travel coincident with and adjacent to said first conveyor and moving in synchronism therewith, said second conveyor carrying fruit holding means; and means to interpose said holding means between the fruit on said first conveyor and the abutting stem gripping portions of said discs to move the fruit relatively to the stem portions thus gripped to separate the fruit and the stem portion.

10. Stemming mechanism for cherries and like fruit, including a first shaft, a first disc of flexible material mounted thereon for rotation in a first plane, means for driving said first disc, a second shaft disposed in the same plane as the first shaft and angularly arranged relative to said first shaft, a second disc of flexible material mounted on said second shaft for rotation in a second plane intersecting said first plane at an acute angle, means for holding said discs at such close range as to deform substantial and corresponding marginal parts thereof into parallel abutting relationship relative to one another for driving said second disc in unison with said first disc, conveyor means for presenting a stem portion of a fruit between the abutting disc portions to be gripped thereby, a second conveyor having a portion of its path of travel coincident with and adjacent to said conveyor means and traveling in synchronism therewith, said second conveyor carrying fruit holding means thereon, and means to interpose said holding means between the fruit and said discs for holding the fruit against movement with the stem thus gripped to separate the fruit and the stem.

11. Stemming mechanism for cherries and like fruit, including a conveyor line for moving cherries in single file along a predetermined path, a pair of discs of flexible material mounted adjacent said line for rotation in diverging planes, said discs being positioned so closely relative to one another that substantial marginal portions thereof are deformed into parallel abutting relationship so that said abutting portions meet at a point which is substantially tangential of the path of the stems of cherries carried by said conveyor line whereby the cherry stems enter between said abutting portions and are drawn thereby substantially perpendicular with respect to said predetermined path and substantially coincident with the stem axes of the cherries as they are moved along said path; a second conveyor having a portion of its path of travel coincident with and adjacent to said fruit conveyor line and traveling in synchronism therewith, said second conveyor carrying fruit retaining means, and means to interpose said retaining means between the conveyed cherries and said discs for retaining said cherries in their path of travel against the perpendicular drawing force thus exerted on their stems.

12. Stemming mechanism for cherries and like fruit, including a conveyor line for carrying cherries along a predetermined path, a pair of discs of flexible material mounted adjacent said line for rotation in different diverging planes; driving means for driving said conveyor line and rotating said discs, said discs being arranged to face the oncoming section of said conveyor line with their open ends, means holding said discs at such close range relative to one another that substantially similar peripheral portions thereof contact and deform one another into parallel abutting relationship so as to grip the cherry stems entering the open ends of said discs for effecting a movement of said stems transversely to said predetermined path and substantially coincident with the stem axes of said cherries, a second conveyor having a portion of its path of travel parallel and adjacent to said fruit conveyor line and moving in synchronism therewith, said second conveyor carrying fruit holding means, and means for projecting said holding means between the conveyed cherries and said discs to hold the cherries against movement with said stems to separate the cherries and their stems.

13. Mechanism according to claim 12 wherein said discs are arranged to rotate with the peripheral portions thereof adjacent said conveyor moving in the same general direction as the movement of said conveyor line and at a circumferential velocity to effect a substantially perpendicular pull upon the stems of the cherries entering between said segments with respect to said predetermined path of the cherries on said conveyor.

14. A stemming mechanism for cherries and like fruit including a conveyor line for carrying cherries along a predetermined path, a pair of discs of flexible material mounted adjacent said line for rotation in different vertically diverging planes, said discs being arranged to face the advancing section of said line with their open ends, means for rotating said discs in a direction in which their peripheral portions nearest the conveyor line travel in the same general direction as the direction of movement of said line, means for holding said discs at such close range relative to one another that substantial marginal portions thereof contact each other to deform one another into parallel abutting relationship so as to grip the stems of cherries moving along said predetermined path for effecting a relatively axial movement of said stems with respect to the stem blossom axes of the cherries moving along said path, a second conveyor having a portion of its path of travel coincident with and adjacent to said conveyor line and traveling in synchronism therewith, said second conveyor carrying fruit holding means thereon, and means to interpose said fruit holding means between the conveyed cherries and said discs to engage the cherries whose stems are gripped between the discs to retain the cherries against axial movement with the stems to separate the cherries from their stems.

WALTER W. KELLY.

REFERENCES CITED

The following references are of record in the file of this patent:

UNITED STATES PATENTS

| Number | Name | Date |
| --- | --- | --- |
| 371,493 | Dolan | Oct. 11, 1887 |
| 1,409,804 | Urschel | Mar. 14, 1922 |
| 1,668,427 | Sephton | May 1, 1928 |
| 1,866,605 | Stewart | July 12, 1932 |
| 2,260,855 | Kittridge | Oct. 28, 1941 |
| 2,360,412 | Frova | Oct. 17, 1944 |
| 2,375,350 | Coons | May 8, 1945 |